2,965,637
NORLEUCINE DERIVATIVES AND PROCESS FOR PRODUCING SAME

Roger D. Westland, Ann Arbor, Mich., assignor to Parke, Davis & Company, Detroit, Mich., a corporation of Michigan No Drawing. Filed Jan. 15, 1958, Ser. No. 708,971

12 Claims. (Cl. 260—239)

This application is a continuation-in-part of our co-pending applications Serial Number 530,486, filed August 25, 1955, now abandoned, and Serial Number 570,418, filed March 9, 1956, and the invention relates to a process for producing 6-diazo-5-oxonorleucine and to certain intermediate norleucine derivatives produced in said process.

In accordance with the invention 6-diazo-5-oxonorleucines which have the formula

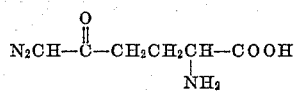

are produced by reacting N-trifluoroacetylglutamic acid with acetic anhydride to produce N-trifluoroacetylglutamic anhydride, reacting the anhydride so obtained with an alcoholic agent to obtain a mixture of the α- and γ-esters of trifluoroacetylglutamic acid, reacting the resulting ester product with a halogenating agent to obtain a 4-carbobenzoxy or 4-carbalkoxy-4-trifluoroacetamidobutyryl halide, treating the halide with diazomethane to obtain the corresponding 6-diazo-5-oxo-N-trifluoroacetylnorleucine ester, hydrolyzing the ester and neutralizing the hydrolysis product. These transformations can be illustrated as follows

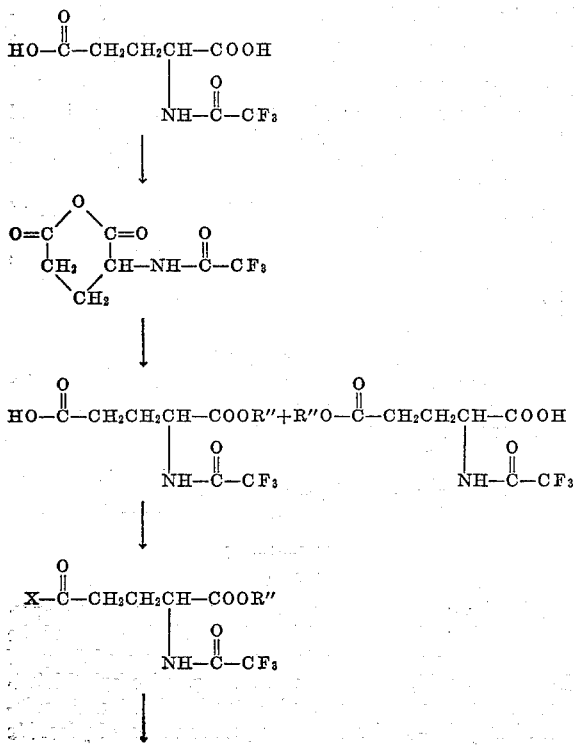

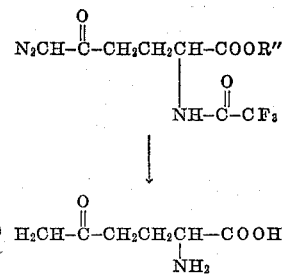

where R″ represents a lower alkyl or benzyl radical and X is a chlorine or bromine atom.

From the formulas given above it will be seen that the 6-diazo-5-oxonorleucine exists in the optically active D and L forms as well as the optical racemic DL form and that the same is true of the intermediate products and starting products used in the preparation of these substances. It is to be understood that the formulas throughout the specification and claims, in the absence of a designation to the contrary, represent the D-optical isomer, the L-optical isomer or the DL-optically inactive form of the chemical compounds. The same convention, in the absence of a designation to the contrary, is to be applied to the chemical names appearing in the specification and claims. Thus, where a chemical name does not specify which optical form is intended, the name is to be interpreted in its generic sense, that is, as meaning either the D-optical isomer, the L-optical isomer or the optically racemic DL-form.

The reaction between N-trifluoroacetylglutamic acid and acetic anhydride is carried out, preferably in the absence of solvent, at room temperature or above under anhydrous conditions. In order to minimize the possibility of racemization, it is desirable to carry out the reaction at temperatures not in excess of 100° C. At least one equivalent, and preferably an excess, of acetic anhydride is employed. For best results, the reaction temperature is maintained between 25 to 100° C.

The alcoholysis of N-trifluoroacetylglutamic anhydride is accomplished with an alcoholic agent such as an alkali metal alkoxide or benzylate or with an alcohol. Specific examples of alcoholic agents which can be used are sodium methoxide, sodium ethoxide, sodium benzylate, methanol, ethanol, benzyl alcohol and the like. In the use of the alkoxides or benzylates, an alcoholic solvent is ordinarily employed in which the hydrocarbon portion corresponds to the hydrocarbon portion of the alcoholic agent. For example, methanol is ordinarily employed in conjunction with sodium methoxide; benzyl alcohol with sodium benzylate; etc. The reaction is carried out at room temperature or below, preferably in the range from −20 to 0° C. The reaction employing an alcohol, as distinguished from an alkoxide or benzylate, is relatively slow; and higher temperatures, that is, temperatures in the range from 20 to 150° C., are preferred. The product of esterification is a mixture of the α- and γ-esters of N-trifluoroacetylglutamic acid. Although the α-ester is the desired starting material for the subsequent halogenation step of the process, it is unnecessary to remove the γ-ester since the mixture itself can be satisfactorily employed as a starting material.

In the halogenation step the product of the preceding esterification step is reacted with at least one equivalent and preferably an excess, of halogenating agent such as thionyl chloride, phosphorus trichloride or tribromide, phosphorus pentachloride or pentabromide. When a phosphorus halide is employed as a halogenating agent, the corresponding acyl halide such as acetyl chloride or bromide is conveniently employed as a solvent and the reaction is carried out below 50° C., preferably at room temperature. Inert organic solvents such as hydrocarbons, chlorinated hydrocarbons, cyclic ethers and the like can also be used. Specific examples of these solvents are benzene, toluene, dioxane, ethylene dichloride. For the reaction employing thionyl chloride a temperature below 80° C. is preferred. The optimal temperature is in the range from 50 to 80° C. Various solvents such as hydrocarbons, chlorinated hydrocarbons, cyclic ethers and the like, can be used although the reaction with thionyl chloride is preferably carried out in the absence of a solvent. The product of halogenation is the corresponding 4-carbobenzoxy- or 4-carbalkoxy-4-trifluoroacetamidobutyryl halide.

The reaction between the 4-carbobenzoxy- or 4-carbalkoxy-4-trifluoroacetamidobutyryl halide and diazomethane is carried out in the cold, preferably in the range of −5 to 10° C., in an inert organic solvent. At least two equivalents of diazomethane are employed. Hydrocarbons such as benzene, toluene and the like, lower aliphatic ethers, cyclic ethers such as dioxane, tetrahydrofuran and the like, can be employed as solvents. The reaction is ordinarily complete in one-half hour at 0–5° C. The product is 6-diazo-5-oxo-N-trifluoroacetylnorleucine ester.

The hydrolysis of the diazo-oxotrifluoroacetylnorlucine ester to a salt of 6-diazo-5-oxonorleucine is carried out in an aqueous alkaline medium at a temperature below about 30° C. The reaction is favored by the use of water-miscible organic solvents such as lower aliphatic alcohols or the like. As alkaline agents, alkali metal or alkaline earth metal hydroxides, carbonates, bicarbonates, oxides, alkoxides, amides and the like can be employed. Preferably, a dilute solution, containing two equivalents of an alkali metal hydroxide such as sodium hydroxide or potassium hydroxide is employed at a temperature in the range of −10 to 0° C. The hydrolysis is ordinarily complete within eight to twelve hours. The hydrolysis product which is a metal salt of 6-diazo-5-oxonorleucine is converted to the free acid 6-diazo-5-oxonorleucine by neutralizing the reaction mixture with acid below room temperature. For this purpose, a mineral acid such as hydrochloric, hydrobromic, sulfuric or phosphoric acid may be employed. Neutralization is accomplished by carefully lowering the pH into the range of 5.5 to 7 and preferably 6 to 6.5. The 6-diazo-5-oxonorleucine is conveniently isolated and purified by selective adsorption and elution methods followed by drying from the frozen state and crystallization. Alternatively, the hydrolysis of the diazo-oxotrifluoroacetylnorleucine ester to 6-diazo-5-oxonorleucine can be accomplished by enzymatic means employing for example a combination of esterase and acylase such as may be obtained from hog kidneys.

The 6-diazo-5-oxonorleucines produced by the process of the invention possess phytotoxic and other interesting properties. They are particularly useful as herbicides, deweeding agents and the like. For this purpose, a dilute aqueous solution is employed and the solution applied to the plant or plant crop in accordance with methods which are known in the art. The compounds are effective in high dilution and in addition have a selective action against certain undesirable weed species. For axample, in the case of L-diazo-5-oxonorleucine, an aqueous solution at a concentration of 1,000 parts per million applied in a spray to the point of drip off to separate vigorously growing test plots of lambsquarter and pigweed gives 100% kills whereas the growth of a comparable plot of corn is inhibited to the extent of only 20% under identical conditions. The 6-diazo-5-oxo-N-trifluoroacetylnorleucine esters with which the invention is concerned are useful as intermediates for the production of 6-diazo-5-oxonorleucines. The method by which these substances can be converted to the 6-diazo-5-oxonorleucines has been described in detail above.

The invention is illustrated by the following examples:

Example 1

A mixture of 36 g. of N-trifluoroacetyl-L-glutamic acid and 50 ml. of acetic anhydride is heated at 100° C. on a water bath for six minutes. 150 ml. of xylene is promptly added and the reaction mixture is stored for sixteen hours at −5° C. The product which separates is removed by filtration, washed with xylene and dried in a vacuum desiccator; M.P. 66–88° C., $[\alpha]_D^{27} = -19.7°$ (4% in dioxane). The product is N-trifluoroacetyl-L-glutamic anhydride which has the formula

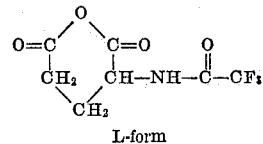

L-form 21 grams of N-trifluoroacetyl-L-glutamic anhydride is quickly dissolved in 100 ml. of cold (0 to 10° C.) methanol containing 5 g. of sodium methoxide. The resultant solution is allowed to stand at 0–15° C. for four hours. The solution is concentrated in vacuo and the residual product is taken up in about 300 ml. of water. The solution is acidified to pH 1.5 with a mixture of concentrated hydrochloric acid and ice. The aqueous solution is extracted five times with 75 ml. portions of ether, and the extracts are combined, dried over anhydrous magnesium sulfate, filtered and the filtrate concentrated in vacuo. The residual product contains a large proportion of the α-methyl ester of N-trifluoroacetyl-L-glutamic acid which has the formula

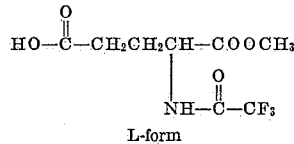

L-form

The product also contains the γ-methyl ester of N-trifluoroacetyl-L-glutamic acid. The corresponding benzyl ester product can be prepared from N-trifluoroacetyl-L-glutamic anhydride by the above procedure employing, instead of methanol and sodium methoxide, a solution of sodium benzylate prepared by reacting 10 g. of benzyl alcohol with 2.1 g. of sodium in 100 ml. of anhydrous dioxane. The resulting benzyl ester product can then be further processed in accordance with the directions which follow, to obtain L-6-diazo-5-oxonorleucine.

The α-benzyl ester of N-trifluoroacetyl-L-glutamic acid can be prepared in a form which is free of the corresponding γ-ester in the following manner: 5 g. of L-glutamic acid, α-benzyl ester (Sachs et al., J. Am. Chem. Soc., 75, 4610 (1953)) is slurried in about 200 ml. of water and the pH is adjusted to 8–9 with 2 N sodium hydroxide solution. 5 grams of ethyl thioltrifluoroacetate is added and the reaction mixture is stirred for six to eight hours at 23–24° C. The mixture is adjusted to pH 2 with concentrated hydrochloric acid-ice mixture and extracted with several portions of ether. The combined ether extracts are dried and concentrated in vacuo. The residual product, N-trifluoroacetyl-L-glutamic acid, benzyl ester, has the formula

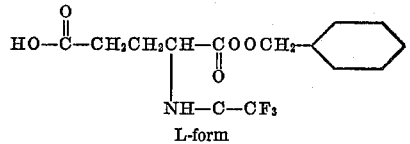

L-form

Likewise, the α-methyl ester of N-trifluoroacetyl-L-glutamic acid can be prepared in a form which is free of the corresponding γ-ester, as follows: A mixture of 50 g. of L-glutamic acid, γ-benzyl ester, 59 g. of ethyl thioltrifluoroacetate and 200 ml. of water is stirred and maintained at pH 7–8 with normal aqueous sodium hydroxide solution until there is no further tendency of the pH to shift. The reaction mixture is filtered and the filtrate extracted first with several portions of ether and then with ethyl acetate; the filter cake is slurried and extracted with ether and the ether and ethyl acetate extracts are combined, dried and concentrated in vacuo to an oil. The oil, which crystallizes on standing, is taken up in a small quantity of ether and recrystallized in two crops by adding cyclohexane-benzene (4:1) and allowing the solution to stand. The crystalline product, N-trifluoroacetyl-L-glutamic acid, γ-benzyl ester, melts at 84° C. after recrystallization from cyclohexane-benzene (1:1) and benzene-petroleum ether. A solution of 22 g. of the product in 75 ml. of ether is slowly added to 300 ml. of ethereal diazomethane (from 30 g. of moist nitrosomethylurea) at 5 to 10° C. The resulting solution is concentrated, and allowed to solidify, in vacuo. The product, N-trifluoroacetyl-L-glutamic acid, α-methyl-γ-benzyl ester, is purified by washing an ether solution of the product with dilute sodium bicarbonate and hydrochloric acid solutions and with water, drying and concentrating in vacuo. A solution of 20 g. of the product in 200 ml. of absolute methanol is hydrogenated in a Parr apparatus over palladium-on-charcoal at 25 p.s.i. for one hour. The product, N-trifluoroacetyl-L-glutamic acid, α-methyl ester, is obtained by filtering the reaction mixture and concentrating the filtrate in vacuo; $[\alpha]_D^{26} = -45°$ (1.0% in ethanol).

The N-trifluoroacetyl-L-glutamic acid, methyl ester, prepared above and containing the contaminating γ-isomer is warmed on a steam bath with 100 g. of thionyl chloride for forty-five minutes at reflux temperature. The resultant solution is concentrated in vacuo to a colorless oil. 25 ml. of benzene is added and all volatile material is removed in vacuo. The residual product is a mixture of L-4-carbomethoxy-4-trifluoroacetamidobutyryl chloride, which has the formula

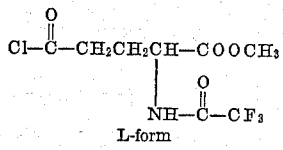

L-form and L-2-trifluoroacetamido-4-carbomethoxybutyryl chloride.

The above product is taken up in 200 ml. of ether and slowly added to an ethereal solution containing four equivalents (15 g.) of diazomethane at 0–5° C. The reaction mixture is allowed to stand at this temperature for approximately thirty minutes and then allowed to warm to 25° C. for two and one-half hours. The reaction mixture is filtered and the solvent is removed by vacuum distillation. The product contains methyl L-6-diazo-5-oxo-N-trifluoroacetylnorleucine ester, which has the formula

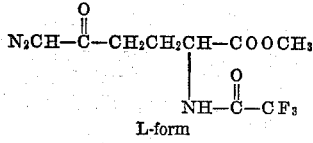

L-form

The above product is taken up in 250 ml. of methanol at 0° C. Two liters of 0.1 N sodium hydroxide cooled to 3° C. are added and the resultant solution is stored for eleven hours at −5° C. The solution is neutralized with a mixture of 2 N hydrochloric acid and ice to pH 6 and then concentrated in a circulating evaporator at temperatures of 20–30° C. to a volume of 500 ml. The product, containing L-6-diazo-5-oxonorleucine which has the formula

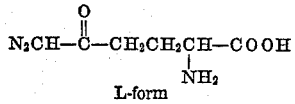

L-form can be purified by selective adsorption and elution from an adsorbent in the following manner: A solution containing not more than 3 g. of L-6-diazo-5-oxonorleucine as determined by bioassay is poured into a column containing a mixture of 200 g. of activated carbon and 200 g. of diatomaceous earth. The product is eluted with about 2.5 hold-up volumes of 1% aqueous acetone and the eluate is collected in one-tenth hold-up volume fractions. The fractions showing the strongest ultraviolet absorption at 275 millimicrons are frozen and the ice sublimed from the frozen mass to yield L-6-diazo-5-oxonorleucine as a light yellow powder. The powder on recrystallization from ethanol has an optical rotation, $[\alpha]_D^{26}$, of +21° (c.=5.4% in water).

*Example 2*

A mixture of 50 g. of DL glutamic acid, γ-benzyl ester, 108 g. of ethyl thioltrifluoroacetate and 400 ml. of water is stirred and maintained at pH 7–8 with normal aqueous sodium hydroxide solution until there is no further tendency of the pH to shift. The reaction mixture is filtered and the filtrate extracted first with several portions of ether and then with ethyl acetate; the filter cake is slurried and extracted with ether and the ether and ethyl acetate extracts are combined, dried and concentrated in vacuo to an oil. The oil, which crystallizes on standing, is taken up in a small quantity of ether and recrystalized in two crops by adding cyclohexane-benzene (4:1) and allowing the solution to stand. The crystalline product, N-trifluoroacetyl-DL-glutamic acid, γ-benzyl ester is purified by recrystallization from cyclohexane-benzene (1:1) and from benzene-petroleum ether. A solution of 44 g. of the product in 150 ml. of ether is slowly added to 600 ml. of ethereal diazomethane (from 60 g. of moist nitrosomethylurea) at 5 to 10° C. The resulting solution is concentrated, and allowed to solidify, in vacuo. The product, N-trifluoroacetyl-DL glutamic acid, α-methyl-γ-benzyl ester, is purified by washing an ether solution of the product with first dilute sodium bicarbonate solution, then with dilute hydrochloric acid solution and finally with water. The solution is dried and evaporated to dryness in vacuo. A solution of 40 g. of the product in 400 ml. of absolute methanol is hydrogenated in a Parr apparatus over palladium-on-charcoal at 25 p.s.i. for one hour. The product, N-trifluoroacetyl-DL-glutamic acid, α-methyl ester, is obtained by filtering the reaction mixture and evaporating the filtrate to dryness in vacuo.

The N-trifluoroacetyl-DL-glutamic acid, α-methyl ester, prepared above is warmed on a steam bath with 200 g. of thionyl chloride for forty-five minutes at reflux temperature. The resultant solution is concentrated in vacuo to a colorless oil. 50 ml. of benzene is added and all volatile material is removed in vacuo. The residual product is a DL-4-carbomethoxy-4-trifluoroacetamidobutyryl chloride, which has the formula

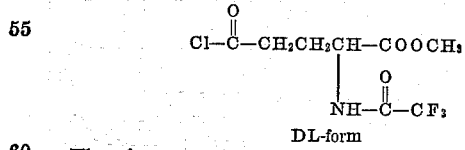

DL-form

The above product is taken up in 400 ml. of ether and slowly added to an ethereal solution containing four equivalents (30 g.) of diazomethane at 0–5° C. The reaction mixture is allowed to stand at this temperature for approximately thirty minutes and then allowed to warm to 25° C. for two and one-half hours. The reaction mixture is filtered and the solvent is removed by vacuum distillation. The product is methyl DL-6-diazo-5-oxo-N-trifluoroacetylnorleucine ester, which has the formula

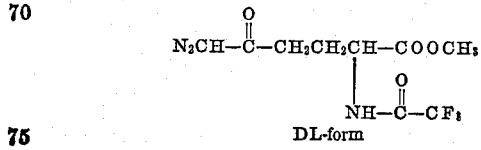

DL-form

The above product is dissolved in 500 ml. of methanol at 0° C. and four liters of 0.1 N sodium hydroxide cooled to 3° C. are added to the solution. The resulting solution is stored for eleven hours at —5° C. and then neutralized with a mixture of 2 N hydrochloric acid and ice to pH 6. The solution is concentrated in a circulating evaporator at temperatures of 20–30° C. to a volume of about 1000 ml. The crude product which contains the desired DL 6-diazo-5-oxonorleucine of formula

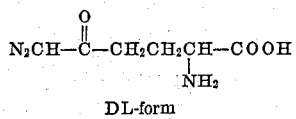

DL-form can be purified by the adsorption and elution technic described in Example 1. The product after recrystallization from ethanol has an ultraviolet absorption spectrum in phosphate buffer at pH 7 which shows two maxima, one of $E_{1\,cm.}^{1\%} = 683$ at 274 millimicrons and another of $E_{1\,cm.}^{1\%} = 376$ at 244 millimicrons

I claim:
1. A compound of formula,

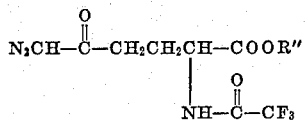

where R″ is a member of the class consisting of lower alkyl and benzyl radicals.

2. L-6-diazo-5-oxo-N-trifluoroacetylnorleucine, methyl ester.

3. DL-6-diazo-5-oxo-N-trifluoroacetylnorleucine, methyl ester.

4. Process for the production of 6-diazo-5-oxonorleucines which comprises reacting N-trifluoroacetylglutamic acid and at least one equivalent of acetic anhydride, reacting the resulting N-trifluoroacetylglutamic anhydride with an alcoholic agent to obtain a mixture of α- and γ-esters of N-trifluoroacetylglutamic acid, reacting said α-ester with a halogenating agent to obtain a halide compound having the formula,

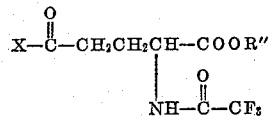

reacting said halide compound with at least two equivalents of diazomethane, hydrolyzing the resulting 6-diazo-5-oxo-N-trifluroacetylnorleucine ester and neutralizing the product of hydrolysis.

5. Process according to claim 4 wherein the reaction with N-trifluoroacetylglutamic acid is carried out in the range between room temperature and 100° C.

6. Process according to claim 4 wherein the reaction with N-trifluoroacetylglutamic anhydride is carried out with sodium methoxide below room temperature.

7. Process according to claim 4 wherein the reaction with the α-ester of N-trifluoroacetylglutamic acid is carried out with at least one equivalent of thionyl chloride at a temperature in the range from 50 to 80° C.

8. Process according to claim 4 wherein the reaction with diazomethane is carried out at a temperature in the range of —5 to 10° C.

9. Process according to claim 4 wherein the hydrolysis is carried out in an equeous alkaline medium at a temperature below about 30° C.

10. Process according to claim 4 wherein the product of hydrolysis is neutralized with acid to pH 5.5 to 7 below room temperature.

11. Process for the production of 6-diazo-5-oxonorleucine which comprises subjecting 6-diazo-5-oxo-N-trifluoroacetylnorleucine ester to alkaline hydrolysis in an aqueous medium at a temperature below about 30° C. and neutralizing the product of hydrolysis with acid to pH 5.5 to 7 below room temperature.

12. Process for the production of 6-diazo-5-oxonorleucines which comprises reacting N-trifluoroacetylglutamic acid α-ester of formula,

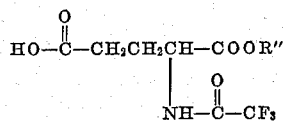

with at least one equivalent of a halogenating agent to obtain a halide compound having the formula,

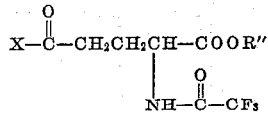

reacting said halide compound in the cold with at least two equivalents of diazomethane to obtain a 6-diazo-5-oxo-N-trifluoroacetylnorleucine ester of formula,

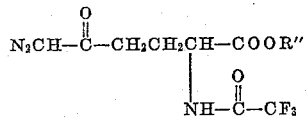

subjecting said ester to hydrolysis in an aqueous alkaline medium at a temperature below about 30° C. and neutralizing the product of hydrolysis with acid to pH 5.5 to 7 below room temperature; where R″ is a member of the group consisting of lower alkyl and benzyl groups and X is a halogen of the class consisting of chlorine and bromine.

References Cited in the file of this patent

FOREIGN PATENTS 550,604 Belgium ---------------- Dec. 16, 1956
2529/56 Union of South Africa ---- Aug. 3, 1956

OTHER REFERENCES

Article, Chem. and Eng. News, Apr. 30, 1956, p. 2119.
Sheehan: J. Am. Chem. Soc., vol. 72, p. 2470 (1950).
Anson: Adv. in Prot. Chem., vol. 12, pp. 472; 474–475 (1957).
Anson: Advances in Protein Chemistry, vol. 12, pp. 472–3 (1957), Academic Press Inc., N.Y.